United States Patent [19]

Clement

[11] 4,406,069
[45] Sep. 27, 1983

[54] PERPENDICULARITY INDICATOR FOR MACHINE TOOL AND METHOD OF OPERATION

[76] Inventor: Michael H. Clement, 4797 Myrtle Dr., Concord, Calif. 94521

[21] Appl. No.: 232,679

[22] Filed: Feb. 9, 1981

[51] Int. Cl.³ .......................... B27G 23/00; G01B 3/22
[52] U.S. Cl. ............................... 33/185 R; 33/172 D; 33/174 Q
[58] Field of Search ............ 33/185 R, 174 Q, 172 D, 33/169 C, 181 R, 180 R; 408/72 R, 75, 115 R, 116

[56] References Cited
U.S. PATENT DOCUMENTS 2,689,412  9/1954  Young ......................... 33/185 R X
3,763,570 10/1973  Andersen ..................... 33/185 R X

OTHER PUBLICATIONS

"Vertical Head Alignment Tool", Western Electric Tech. Digest #61, A. Zigon, 1/81.

Primary Examiner—Harry N. Haroian
Attorney, Agent, or Firm—Fitch, Even, Tabin & Flannery

[57] ABSTRACT

A method and apparatus is disclosed for determining perpendicularity between a tool mounting assembly and a work surface of a machine tool, the apparatus being in the form of a device including a shaft adapted for mounting in the tool mounting assembly and having a generally perpendicular platform rotatable about a longitudinal axis of the shaft, a plurality of at least three proximity indicators being mounted on the platform in equidistant relation from the axis of rotation for the shaft, each of the indicators including a movable proximity detecting element arranged for engagement with the work surface, a gauge block preferably being disposable upon the work surface to provide a common reference surface for establishing an initial "zero" setting on each of the indicators.

15 Claims, 2 Drawing Figures

PERPENDICULARITY INDICATOR FOR MACHINE TOOL AND METHOD OF OPERATION

BACKGROUND OF THE INVENTION

The present invention relates to a method and apparatus for determining or establishing alignment between a tool mounting assembly and a work surface of a machine tool and more particularly to such a method and apparatus for determining or establishing perpendicularity between a tool mounting assembly in the form of a rotatable chuck and a work surface of the machine tool.

In the operation of machine tools and the like, it is essential to assure initial alignment between a work surface of the machine tool and a tool mounting assembly or chuck for mounting a tool such as a drill or the like for engaging a work piece arranged upon the work surface.

During operation of such machine tools, it is commonly necessary to repeatedly reestablish proper alignment between the tool and the work surface. For example, substantial stresses may be developed during operation of the machine tool tending to create misalignment between the tool mounting assembly or chuck and the work surface. With the tool mounting assembly being a rotatable chuck, torque forces created by interaction of a rotating tool such as a drill with a workpiece arranged upon the work surface may tend to create misalignment between the chuck and the work surface.

In most instances, it is contemplated that the tool mounting assembly or chuck be exactly perpendicular with relation to the work surface. With such perpendicularity being established, any other desired angular relationship may then be achieved by proper adjustment between the tool mounting assembly or chuck and the work surface.

In the past, efforts to achieve such alignment with the work surface has involved the use of a leveling or alignment device of the type disclosed for example in U.S. Pat. No. 2,689,412 issued Sept. 21, 1954. The device of that patent includes means resting upon the work surface for establishing a predetermined angular relationship with the work surface. Such a device may of course not be satisfactory in assuring proper alignment of a tool secured in a tool mounting device or chuck.

A further example of prior art for assuring alignment between a tool mounting assembly or chuck and a work surface of such a machine tool is further disclosed in U.S. Pat. No. 3,763,570 issued Oct. 9, 1973. That patent includes a method and apparatus for achieving alignment or perpendicularity between a tool mounting assembly and a work surface by mounting separate leveling devices upon both the tool mounting assembly or chuck and the work surface. With a similar reading appearing upon each of the leveling devices, it may be assumed that the tool mounting assembly or chuck is in a desired alignment or is perpendicular to the work surface. However, such a device is depended upon skill of the operator in determining an exactly similar reading for each of the leveling devices. In addition, accuracy of the device of this patent is dependent upon similarity of the leveling devices themselves as well as their manner of attachment to the tool mounting assembly and the work surface.

Furthermore, devices such as that in the above noted patent are also dependent upon a stable environment for the machine tool to permit the obtaining of an accurate reading for the respective leveling devices. Accordingly, it may be difficult to properly align the components of the machine tool if the machine tool is not mounted upon a stable surface. For example, if the machine tool is to be operated on a ship or other unstable platform, the leveling devices of the above noted patent would be entirely unsatisfactory for achieving alignment within the machine tool.

Accordingly, there has been found to remain a need for a method and apparatus for determining or establishing alignment or perpendicularity between a tool mounting assembly such as a chuck and a work surface of a machine tool.

SUMMARY OF THE INVENTION

It is therefore an object of the present invention to provide a method and apparatus for determining or establishing alignment or perpendicularity between a tool mounting assembly or chuck and a work surface of a machine tool while overcoming various problems such as those set forth above.

It is more specifically an object of the invention to provide such a method and apparatus for establishing perpendicularity between the axis of a chuck assembly and a work surface in a machine tool wherein an elongated shaft is adapted for mounting within the chuck assembly in axially fixed, rotatable relation therein, a platform being attached in generally perpendicular relation to the shaft, a plurality of at least three and preferably four adjustable proximity indicators being mounted on the platform in spaced apart relation about the shaft, each of the proximity indicators including a movable proximity detecting element arranged for engagement with the work surface when the shaft is mounted in the chuck assembly.

It is a further related object of the invention to provide such a method and apparatus wherein the adjustable proximity indicators are arranged generally equidistant from the shaft and the axis of the chuck assembly to permit initial adjustment of the respective indicators relative to a common reference.

It is also an object of the invention to provide a device for determining perpendicularity between a tool mounting assembly and a work surface of a machine tool or the like comprising a platform assembly including a platform attached to a shaft, the shaft being adapted for mounting in the tool mounting assembly, the platform being generally perpendicular to the shaft, the platform assembly being further adapted for rotation about a longitudinal axis of the shaft, a plurality of at least three and preferably four proximity indicators being mounted upon the platform in equidistant relation from the axis of rotation for the shaft, each of the indicators including an axially movable, elongated proximity detecting element arranged generally parallel with the shaft and with the axis of rotation for the platform assembly.

It is a further related object of the invention to provide two of the four indicators along a first axis perpendicular to the shaft and two additional indicators arranged along a second axis perpendicular to the shaft and the first axis.

Additional objects and advantages of the invention are made apparent in the following description having reference to the accompanying drawings.

DESCRIPTION OF THE PREFERRED EMBODIMENT

Figure 1:
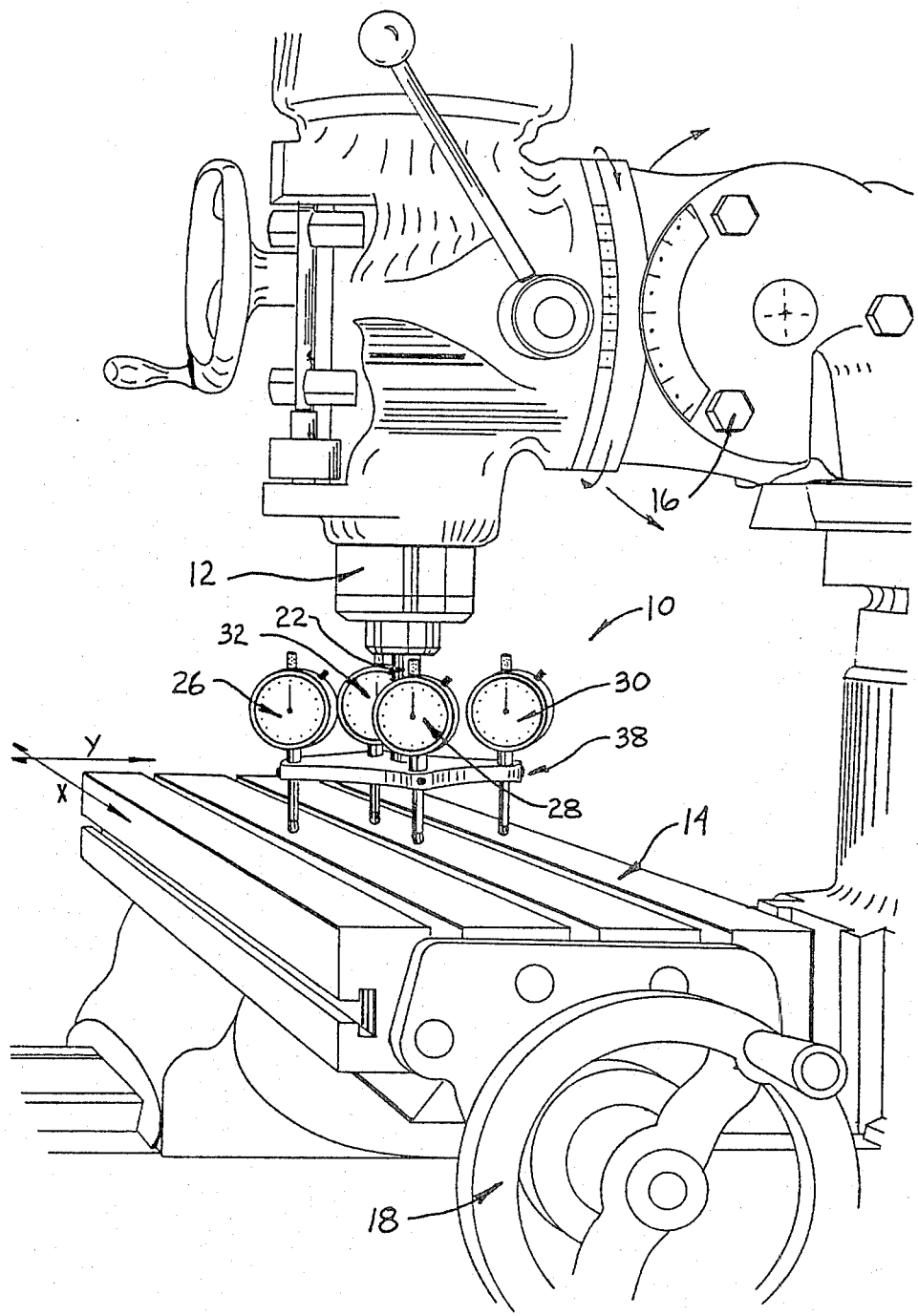
FIG. 1 is a view of the perpendicularity or alignment device of the present invention mounted within the chuck of a machine tool including a work surface for supporting a workpiece adapted for engagement by a tool mounted in the chuck.

Referring to the drawings, the present invention is directed toward a leveling or alignment device generally indicated at 10 and its method of operation for establishing or determining perpendicularity between a tool mounting assembly and a work surface. Those components may be embodied for example in the chuck assembly 12 and adjustable table 14 of the machine tool generally indicated at 16 in FIG. 1. Designation of the device 10 as a leveling tool is somewhat inaccurate since, unlike the prior art, it is not a particularly important feature of the invention to establish horizontal alignment for the table 14. Rather, the method and apparatus of the present invention are directed toward the concept of establishing initial perpendicularity between the table 14 and the longitudinal axis of the tool mounting assembly 12. With the tool mounting assembly being a rotatable chuck as indicated at 12 in FIG. 1, the longitudinal axis of the tool mounting assembly is the axis of rotation for the chuck. With such perpendicularity established between the tool mounting assembly and the work surface, any other angular relation is then possible given the initial perpendicularity between those components. In such a manner, a drill or the like mounted in the chuck assembly 12 would be at an exactly predetermined alignment with a workpiece (not shown) disposed upon the flat surface of the table 14.

Otherwise, the particular type and mode of operation for the machine tool 16 is not particularly important in connection with the present invention except that the table 14 includes controls 18 and 20 for adjusting alignment of the table 14 about perpendicular X and Y axes.

Figure 2:
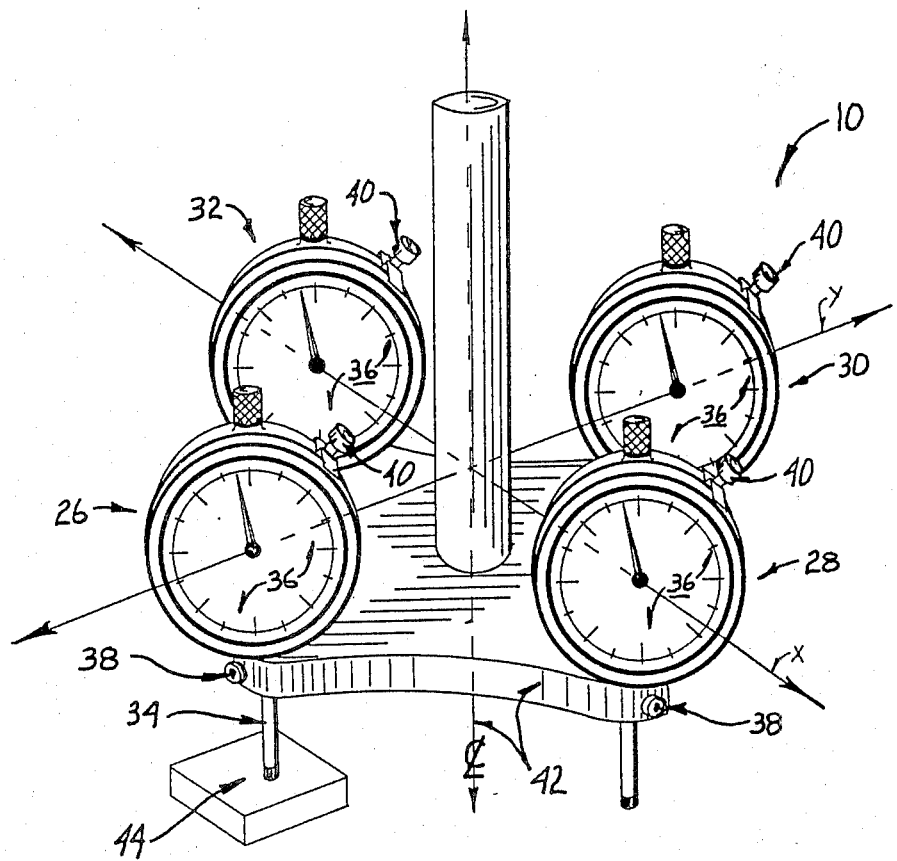
FIG. 2 is an enlarged view of the alignment or perpendicularity device of FIG. 1 while further including a gauge block suitable for mounting upon the work surface to permit initial adjustment of each of the plurality of indicators.

The alignment tool 10 may be best seen in FIG. 2 and includes an elongated shaft of shank 22 adapted for mounting within the chuck assembly 12 generally in the same manner as a tool such as a drill or the like (not shown) would be mounted in the chuck assembly.

A platform 24 is secured to a lower end of the shaft 22 in generally perpendicular relation thereto in order to provide a mounting for plurality of at least three adjustable proximity indicators for establishing or determining the planar location of the table 14 relative to the axis of the shaft 22 and accordingly the axis of rotation for the chuck assembly 12. However, four such adjustable proximity indicators denoted as 26, 28, 30 and 32 are arranged upon the platform 24 in order to permit arrangement of independent sets of two indicators along perpendicular axes, generally indicated at X and Y, passing through the surface of the table 14. As will be described in greater detail below, this arrangement further facilitates arrangement of the table 14 in perpendicular alignment with the axis of the chuck assembly 12.

Each of the adjustable proximity indicators includes an elongated movable proximity detecting element 34 extending downwardly in generally parallel arrangement with the shaft 22 for engagement with the surface of the table 14. The element 34 is resiliently urged downwardly by means (not shown) while being interconnected with an indicating dial 36 to facilitate operation of the device in a manner described in greater detail below. Each of the indicators also includes both a coarse adjustment 38 and a fine adjustment 40 in order to permit adjustment of a reading on the dial 36 relative to the instant position of the element 34. Each of the indicators 26–32 is of similar construction and accordingly the components of the different indicators are denoted by the same numerical labels. At the same time, it is noted that the proximity indicators are of conventional construction in themselves so that a further description of their construction and method of operation is believed unnecessary in connection with the present invention.

As indicated above, the arrangement of the indicators 26–32 relative to the shaft 22 is of particular importance within the present invention. In this connection, each of the indicators is arranged in equidistant relation relative to the shaft 22 and more particularly with reference to an axis of rotation 42 for the chuck assembly 12. At the same time, two of the indicators, for example the indicators 26 and 30 are arranged along an X axis which may correspond for example with one axis of adjustment for the table 14. At the same time, the other two indicators 28 and 32 are arranged along a Y axis which, at the same time, would then be in alignment with another axis of adjustment for the table 14.

This arrangement further facilitates accurate readings in the device 10 since it permits each of the indicators to be adjusted to an initial setting corresponding to a common reference provided for example by means of a gauge block 44. The gauge block 44 may simply be an accurately finished workpiece arranged for example on the table 14 for alignment with any of the indicating elements for the various indicators 26–32 as they are rotated about the shaft 22 and axis or rotation 42. In this regard, it is noted that rotation of the alignment device 10 is permitted because of its mounting within the rotatable chuck assembly 12. However, even if the chuck assembly 12 were replaced by a tool mounting assembly which was not rotatable, such rotation could be accomplished for example by adapting the platform 24 for rotation about the shaft 22.

In any event, the method of operation for employing the alignment device 10 for determining or establishing perpendicularity between the axis of the shaft 22 and the table 14 is believed obvious from the preceding description. However, the method of operation is also described in greater detail below.

Initially, the alignment device 10 is secured within the chuck assembly in the same manner as any conventional tool or the like. A common referent surface is then selected such as the gauge block 44 which may simply be placed upon the surface of the table 14 in alignment with one of the downwardly extending elements 34 for one of the indicators. The adjustment 38 and 40 may then be employed to establish a zero setting on the indicating dial 36 with the element 34 in engagement with the referent surface of the gauge block 44. The device 10 may then be rotated with each of the indicators 26–32 being similarly adjusted to provide an initial zero setting. During this initial setting, it is to be noted that the device is rotated about the axis of the shaft 22 and accordingly about the axis of rotation for the chuck assembly 12 while the table 14 may be in any relative position. However, it is generally preferable that the table be substantially perpendicular with the device in order to assure similar engagement of each of the indicators with the referent surface of the gauge block 44. If any question exists as to initial perpendicularity between the table and the chuck assembly, a single reference point may be established for example upon the surface of the gauge block 44 in order to assure a uniform initial setting for each of the indicators.

With an initial setting thus being established on each of the indicators, the gauge block 44 is removed from the worktable, the alignment device 10 being rotated for alginment of the indicators 26 and 30 with a first axis of adjustment for the table. Because of the arrangement of the four indicators as described above, the other pair of indicators 28 and 32 would then be in alignment with a second axis of adjustment for the table 14. Accordingly the leveling controls for the table may then be operated in order to adjust alignment of the table with the proximity indicating elements 34 for the four indicators 26-32. In this operation, one axis of the table may first be aligned with two of the indicators, for example, the indicators 26 and 30, the other leveling control for the table then being operated in order to also place the table in contact with the other pair of indicators 28 and 32.

With the table thus aligned in contact with the indicating elements 34 for all of the indicators 26-32, the table will be exactly perpendicular to the shaft 22 and accordingly the axis of rotation 42 for the chuck assembly 12. At that time, the alignment device 10 may be removed from the chuck assembly and a tool placed therein for performing a selected operation. Because the tool would also be aligned along the axis of rotation for the chuck assembly 12, its alignment with a workpiece arranged upon the table 14 would also be established. As noted above, with perpendicularity being initially established between the table 14 and the chuck assembly 12, any other angular alignment could then be established based on their initial perpendicularity.

Accordingly, there has been described a method and apparatus for establishing or determining perpendicularity between a work surface and a tool mounting assembly for a machine tool or the like. Various modifications are believed apparent based on the embodiment described above. Accordingly, the scope of the present invention is defined only by the following appended claims.

What is claimed is:

1. A device for determining perpendicularity between the axis of rotation of a chuck assembly and a work surface in a machine tool, comprising an elongated shaft for mounting in the chuck assembly in axially fixed, rotatable relation, a platform attached to the shaft, the platform being generally perpendicular to the shaft and the axis of rotation of the chuck assembly when the shaft is mounted in the chuck assembly, and a plurality of at least three adjustable proximity indicators mounted on the platform in spaced apart relation about the shaft, each of the proximity indicators including a movable proximity detecting element arranged for engagement with the work surface when the shaft is mounted in the chuck assembly.

2. The device of claim 1 wherein the adjustable proximity indicators are arranged generally equidistant from the shaft and the axis of the chunk assembly to permit initial adjustment of the respective indicators relative to a common reference.

3. The device of claim 2 wherein the plurality of indicators includes two indicators arranged along a first axis perpendicular to the shaft and two indicators arranged along a second axis perpendicular to the shaft and the first axis.

4. The device of claim 1, 2 or 3 wherein each of the proximity indicators includes means for resiliently urging the movable proximity detecting element toward the work surface and means for indicating the position of the movable proximity detecting element.

5. The device of claim 4 wherein the indicating means includes a dial indicator.

6. The device of claim 1 wherein its shaft is mounted in the chuck assembly, the chuck assembly including means for rotating the device about the axis of the chuck assembly.

7. A device for determining perpendicularity between a tool mounting assembly and a work surface adjacent the tool mounting assembly, comprising a platform assembly including a platform attached to a shaft, the shaft being adapted for mounting in the tool mounting assembly, the platform being generally perpendicular to the shaft, the platform assembly being adapted for rotation about a longitudinal axis of the shaft, and a plurality of at least three adjustable proximity indicators mounted on the platform in equidistant relation from the axis of rotation for the shaft each of the indicators including an axially movable, elongated proximity detecting element arranged generally parallel with the axis of rotation for the platform assembly.

8. The device of claim 7 wherein the plurality of indicators includes two indicators arranged along a first axis perpendicular to the shaft and two additional indicators arranged along a second axis perpendicular to the shaft and the first axis.

9. The device of claim 7 or 8 wherein each of the proximity indicators includes means for resiliently urging the movable proximity detecting element toward the work surface and means for indicating the position of the movable proximity detecting element.

10. The device of claim 9 wherein the indicating means includes a dial indicator.

11. The device of claim 7 wherein its shaft is mounted in the tool mounting assembly, the tool mounting assembly including means for rotating the device about the shaft axis.

12. In a method for determining perpendicularity between the axis of a tool mounting assembly and a work surface in a machine tool, the step comprising mounting an alignment device in the tool mounting assembly including a plurality of at least three adjustable proximity indicators spaced generally equidistant from a longitudinal axis of the tool mounting assembly, each of the proximity indicators including an elongated proximity detecting element arranged generally parallel with the axis of the tool mounting assembly for engagement with the work surface, the device further being adapted for rotation relative to the axis of the tool mounting assembly, adjusting each of the indicators to an initial setting based on a common referent surface, and then adjusting the work surface to place it in similar engagement with the detecting elements for the plurality of proximity indicators.

13. The method of claim 12 wherein the device includes a first pair of indicators arranged along a first axis perpendicular to the longitudinal axis of the tool mounting assembly and a second pair of indicators arranged along a second axis perpendicular to both the axis of the tool mounting assembly and the first axis.

14. The method of claim 12 or 13 further comprising the step of arranging a gauge block upon the work surface in spaced apart relation from the axis of the tool mounting assembly for engagement with each of the indicators upon suitable rotation of the device and establishing an initial setting for each of the indicators with reference to a surface on the gauge block.

15. The method of claim 14 wherein the tool mounting assembly is a rotatable chuck assembly.

* * * * *